United States Patent
Cordani

(10) Patent No.: US 10,328,295 B2
(45) Date of Patent: Jun. 25, 2019

(54) CELLULAR PHONE CASING

(71) Applicant: GelTech Solutions, Inc., Jupiter, FL (US)

(72) Inventor: Peter Cordani, Palm Beach Gardens, FL (US)

(73) Assignee: GelTech Solutions, Inc., Jupiter, FL (US)

( * ) Notice: Subject to any disclaimer, the term of this patent is extended or adjusted under 35 U.S.C. 154(b) by 0 days.

(21) Appl. No.: 15/797,705

(22) Filed: Oct. 30, 2017

(65) Prior Publication Data

US 2018/0064972 A1 Mar. 8, 2018

Related U.S. Application Data

(63) Continuation-in-part of application No. 14/682,542, filed on Apr. 9, 2015, which is a continuation-in-part of application No. 14/620,925, filed on Feb. 12, 2015.

(60) Provisional application No. 62/064,011, filed on Oct. 15, 2014.

(51) Int. Cl.
| | |
|---|---|
| *A62C 3/00* | (2006.01) |
| *A62C 3/16* | (2006.01) |
| *H04M 1/02* | (2006.01) |
| *A62D 1/00* | (2006.01) |
| *H04B 1/3827* | (2015.01) |

(52) U.S. Cl.
CPC ............ *A62C 3/16* (2013.01); *A62D 1/0014* (2013.01); *A62D 1/0064* (2013.01); *H04B 1/3833* (2013.01); *H04M 1/026* (2013.01); *H04M 1/0249* (2013.01)

(58) Field of Classification Search
CPC .......... A62C 3/16; A62C 36/10; A62D 1/0035
USPC ..................................... 169/54, 58
See application file for complete search history.

(56) References Cited

U.S. PATENT DOCUMENTS

| | | | | |
|---|---|---|---|---|
| 5,056,603 | A * | 10/1991 | Parkinson | A62C 3/00 169/26 |
| 5,175,197 | A * | 12/1992 | Gestner | C09D 5/34 252/606 |
| 5,390,580 | A * | 2/1995 | Gibbons, Jr. | F41H 5/0457 109/49.5 |
| 6,915,861 | B2 | 7/2005 | Goodworth et al. | |
| 7,992,647 | B2 * | 8/2011 | Cordani | B64D 25/00 169/30 |
| 8,676,281 | B1 * | 3/2014 | Caulder | H04M 1/0283 455/575.1 |
| 8,745,795 | B2 * | 6/2014 | Klancnik | A47C 27/001 5/483 |
| D714,276 | S * | 9/2014 | Hu | D14/250 |

(Continued)

FOREIGN PATENT DOCUMENTS

| | | | |
|---|---|---|---|
| CN | 201204619 Y | * 3/2009 | |
| CN | 202918344 U | * 5/2013 | |
| JP | WO 2013161427 A1 | * 10/2013 | H01M 2/1072 |

*Primary Examiner* — Viet Le
(74) *Attorney, Agent, or Firm* — McHale & Slavin, P.A.

(57) ABSTRACT

A cellular phone case in combination with a flexible packet holding an admixture of water and super absorbent material to provide heat dissipation, heat indication, and fire extinguishment properties. The cellular phone case has a translucent rear surface and the packet fits inside the case between the bottom surface of the case and the underside of a cellular phone. The packet dissipates heat during a recharging condition, and provides a fire retardant agent to arrest a lithium battery meltdown.

6 Claims, 3 Drawing Sheets

(56) References Cited

U.S. PATENT DOCUMENTS

| | | | | |
|---|---|---|---|---|
| 9,590,684 | B2 * | 3/2017 | Poon | H04B 1/3888 |
| D794,006 | S * | 8/2017 | Dong | D14/250 |
| 9,729,183 | B2 * | 8/2017 | Bae | B29C 45/1418 |
| 9,871,551 | B2 * | 1/2018 | Poon | H04B 1/3888 |
| 9,894,192 | B2 * | 2/2018 | Cox, III | H04M 1/185 |
| 2008/0053770 | A1 * | 3/2008 | Tynyk | A45C 11/00 |
| | | | | 190/100 |
| 2011/0297402 | A1 * | 12/2011 | Belmonte | A62C 3/00 |
| | | | | 169/56 |
| 2013/0011701 | A1 * | 1/2013 | Petzinger | H01M 2/1077 |
| | | | | 429/48 |
| 2013/0146603 | A1 * | 6/2013 | Brilmyer | G11B 33/1406 |
| | | | | 220/560.01 |
| 2018/0064972 | A1 * | 3/2018 | Cordani | A62C 3/16 |

\* cited by examiner

CELLULAR PHONE CASING

PRIORITY CLAIM

In accordance with 37 C.F.R. § 1.76, a claim of priority is included in an Application Data Sheet filed concurrently herewith. Accordingly, the present invention claims priority as a continuation-in-part of U.S. patent application Ser. No. 14/682,542, entitled "FIRE SUPPRESSION PACKAGING", filed Apr. 9, 2015, which is a continuation-in-part of U.S. patent application Ser. No. 14/620,925, entitled "FIRE SUPPRESSION PACKAGING AND METHOD OF MANUFACTURE", filed Feb. 12, 2015, which claims priority to U.S. Provisional Patent Application No. 62/064,011, entitled "BATTERY STORAGE DEVICE AND METHOD OF MANUFACTURE", filed Oct. 15, 2014. The contents of the above referenced applications are incorporated herein by reference.

FIELD OF THE INVENTION

The present invention relates to gel packs and, in particular, to thermal gel packs used in combination with a cellular phone case to provide cooling, heat indication, fire retardant.

BACKGROUND OF THE INVENTION

Cellular phone cases are designed to attach to, support, or otherwise hold a cellular phone. Conventional cellular phone protective cases generally have anti-drop, anti-shatter, anti-scratch, and waterproof properties. All of which can cause the cellular phone to retain heat. It is noted that during use or recharge, a cellular telephone may increase in temperature. This is especially noticeable when the cellular phone is being recharged.

Some cellular phones have an automatic shut-off in the case the internal temperature of the phone exceeds a predetermined temperature leaving the user to wait until the temperature returns to a normal operating level before further usage. It would be advantageous to provide a device that capable of cooling a cellular telephone in instances where it is overheated. It would also be advantageous to provide a device that changes colors to indicate a change in temperature. For example, as the temperature of the cellular telephone rises the device would be able to change color incrementally, thereby allowing the user to know when the temperature of the phone is rising.

Cellular phones have also been reported to have caught fire due to lithium battery explosions. Lithium ion batteries are used to power almost all cellular phone devices but after reports of battery explosions new concerns about their safety have arisen. Several measures were taken in light of the lithium battery explosions. For example, the Federal Aviation Administration instructs passengers to turn off the phones during flights and are contemplating their placement in checked baggage has a preventative measure. Additionally, the Consumer Product Safety Commission advised consumers to stop charging or using the Samsung Galaxy Note 7.

Because of the usefulness of lithium ion batteries, it is unlikely that they will cease to be used in cellular phone devices. Lithium ion batteries are rechargeable, built directly into the cell phone device, and rely on lithium as their primary fuel. Lithium ion batteries work by storing energy and releasing it through controlled chemical reactions. Software inside the cellular phone determines exactly how much the battery should be charged and how fast, if those protocols are set incorrectly, it can destabilize some chemicals inside the battery and cause a chain reaction that researchers call a "thermal runaway" and may lead to fire or explosions.

Thus it would be advantageous to provide a cellular phone case having a device attached to the cellular phone case that can help dissipate heat as well as protect the phone from lithium ion battery failure.

It is further noted that a cell phone is not just a device that connects people and provides media; it has also become a fashion accessory. Color is an important factor people consider when buying mobile devices and cases. Companies have taken advantage of this by offering various colored telephones and associated cases. For example, during the arrival of Valentine's Day colors like chocolate brown and red become popular and cellular phone and case companies advertise these colors to play on the need for new fashion accessories by consumers. Companies have targeted age groups by offering various colors that attract specific age groups as well as genders. Teenage girls like shades of pink, lavender etc. to show their "girly" side. Many girls have wardrobes full of cell phone covers just to match their different dresses. Older boys, on the other hand, like gothic and psychedelic colors. In today's expanding world of cellular phones and accessories, there is a cell phone case color for each person that is an extension of each person's individuality, expression, and personality.

Thus it would advantageous to provide a cellular phone case having interchangeable cooling gel packets that come in various colors to provide an extension of each person's individuality, expression, and personality. Alternatively, a gel pack capable of changing color with the addition of heat provides both an indication of the temperature demands as well as a safety factor should the cell phone battery have a thermal meltdown.

SUMMARY OF THE INVENTION

A transparent or translucent cellular phone case in combination with a gel pack to provide heat dissipation, heat indication, and safety should a battery thermal meltdown occur. The cellular phone case includes a transparent or translucent surface with a gel pack constructed and arranged to fit between the case and the underside of a cellular phone.

It is an objective of the instant invention to provide a cellular phone case in combination with a flexible packet containing a fluid/gel-like material with properties such as heat dissipation, indication of heat variance, and fire extinguishment. The flexible packet is a sealed pouch holding at least 3 ounces of an admixture of super absorbent polymer and water. The admixture has properties which enable the polymer to be confined to a particular area because of its relatively high viscosity. The properties of the admixture, in particular its viscosity, enable the admixture to remain on vertical, horizontal, and curved surfaces formed by the gel pack.

Still another objective of the instant invention is to provide a cellular phone casing in combination with a gel pack that as changes colors allowing the user to know when the temperature of the phone is rising.

Another objective of the instant invention is to provide a cellular phone casing in combination with a cooling gel pack that maintain the phone at an optimal temperature thereby protecting the phone from lithium ion battery failure as well as in the event of an explosion or fire provide a fire-retardant agent that extinguishes the fires instantaneously.

Yet another objective of the instant invention is to provide a cellular phone casing in combination with a gel packet whereby the packets are interchangeable and come in a variety of colors.

An objective of the instant invention is to provide a cellular phone casing in combination with a heat distributing gel pack for an effective cooling effect of the phone.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
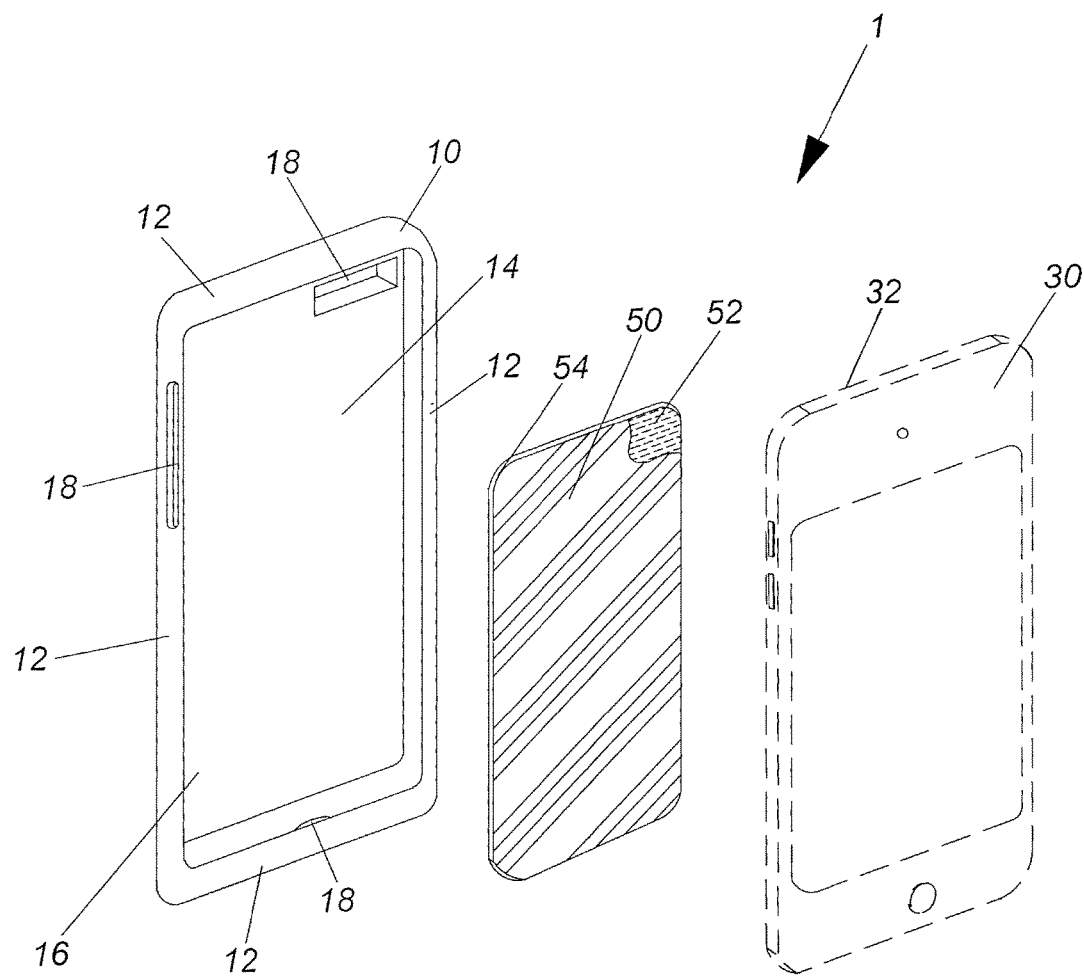
FIG. 1 is an exploded view of the cooling cellular phone casing.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
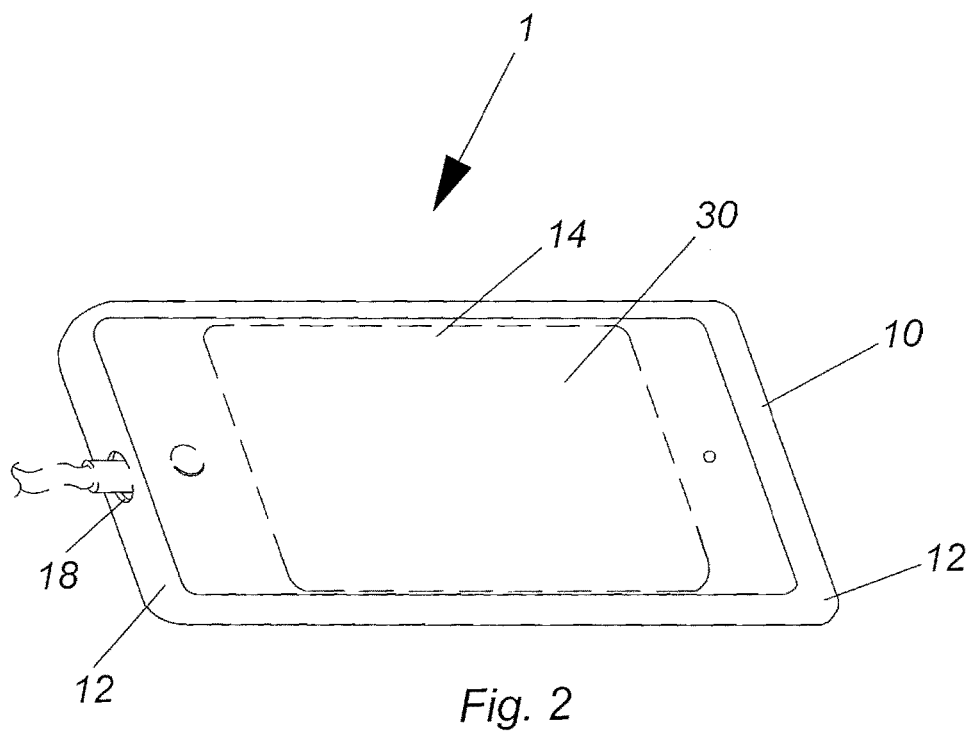
FIG. 2 is a top perspective view of the instant invention.
Figure 3:
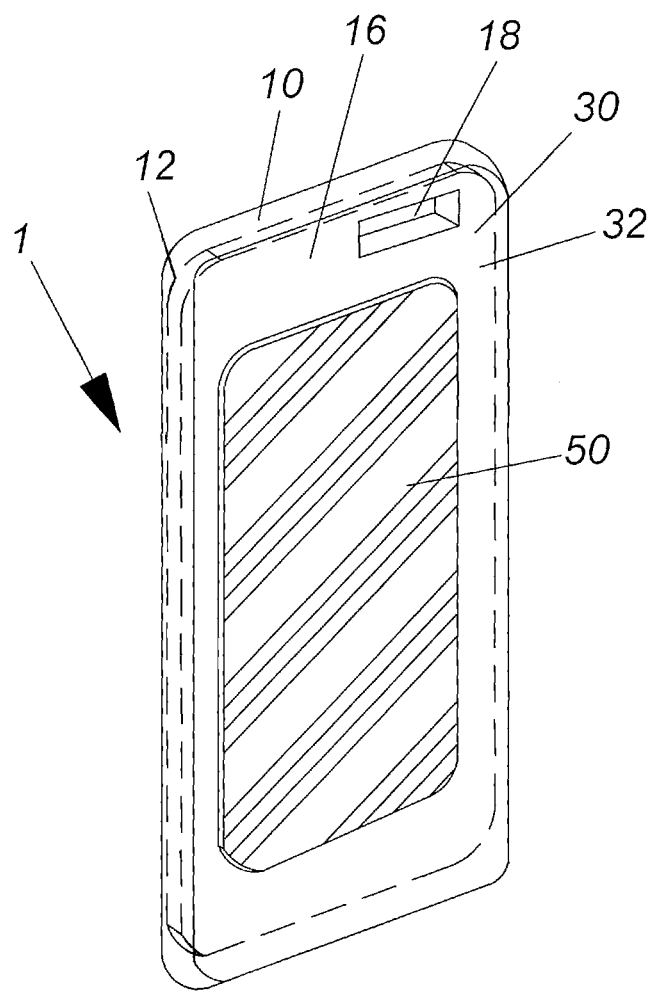
FIG. 3 is a back perspective view of the instant invention.

Referring now to the FIGS. 1-3, a cellular phone case 10 for enclosing and protecting a cellular telephone 30 without interfering with the normal functionality of the cellular phone 30. The casing 10, preferably made of silicone, includes walls 12 which define an interior volume for fully enclosing the cellular telephone 30. The casing 30 has accessory wells 18, such as speaker wells, charger wells, and microphone wells, which allow uninhibited communication with the telephone 30 through the casing 10. At least one opening 14 is provided to allow buttons of the telephone 30 to be operated and displays to be visualized, and a transparent or translucent bottom surface 16. The casing 10 has a generally rectangular shape to conform to the general shape of most cellular phone 30; however, any shape is contemplated dependent upon the design and shape of a cellular phone 30.

A packet 50 is sized to fit inside the case 10 between a transparent or translucent back wall 16 of the case 10 and the underside 32 of a cellular phone 30. For purposes of this application, translucent and transparent will be used interchangeably. The packet 50 contains an admixture 52 comprised of a hydrated amount of super absorbent polymer. In general embodiments, a fire extinguishing composition comprises a super absorbent polymer in amounts to effectively extinguish, suppress and prevent the spread of fire. In preferred embodiments, the fire extinguishing composition comprises a biodegradable, super absorbent, aqueous based polymer. Examples of these polymers are: cross-linked modified polyacrylamides/potassium acrylate or polyacrylamides/sodium acrylate. Other suitable polymers include, albeit not limited to, carboxy-methylcellulose, alginic acid, cross-linked starches, and cross-linked polyamino acids. In some preferred embodiments, the fire extinguishing composition is a dry powder or dry granules. In other embodiments, the composition is hydrated. The hydrated composition may be a liquid, slurry, sludge, gel, foam or any form depending on the amount of water or other liquids added to the composition. A colorant present in the composition from about 10% dry weight to about 90% dry weight; an opacifier or opacifier blend is present in the composition from about 10% dry weight to about 60% dry weight.

Examples of colorants, include, with and without thermochromic qualities, refers to ingredients such as pigments and dyes and the like including without limitation: aniline black; anthraquinone black; carbon black; copper carbonate; graphite; iron oxide; micaceous iron oxide; manganese dioxide, azo condensation, metal complex brown; antimony oxide; basic lead carbonate; lithopone; titanium dioxide; white lead; zinc oxide; zinc sulfide; titanium dioxide, ferric oxide covered mica; bismuth oxychloride crystal; dioxazine violet; carbazole blue; cobalt blue; indanthrone; phthalocyanine blue; Prussian blue; ultramarine; chrome green; hydrated chromium oxide; phthalocyanine green; anthrapyrimidine; arylamide yellow; barium chromate; benzimidazolone yellow; bismuth vanadate; cadmium sulfide yellow; complex inorganic color; diarylide yellow; disazo condensation; flavanthrone; isoindoline; isoindolinone; lead chromate; nickel azo yellow; organic metal complex; yellow iron oxide; zinc chromate; perinone orange; pyrazolone orange; anthraquinone; benzimidazolone; BON arylamide; cadmium red; cadmium selenide; chrome red; dibromanthrone; diketopyrrolo-pyrrole; lead molybdate; perylene; pyranthrone; quinacridone; quinophthalone; red iron oxide; red lead; toluidine red; β-naphthol red; aluminum flake; aluminum non-leafing, gold bronze flake; zinc dust; stainless steel flake; nickel flake; nickel powder; barium ferrite; borosilicate; burnt sienna; burnt umber; calcium ferrite; cerium; chrome orange; chrome yellow; chromium phosphate; cobalt-containing iron oxide; fast chrome green; gold bronze powder; luminescent; magnetic; molybdate orange; molybdate red; oxazine; oxysulfide; polycyclic; raw sienna; surface modified pigment; thiazine; thioindigo; transparent cobalt blue; transparent cobalt green; transparent iron blue; transparent zinc oxide; triarylcarbonium; zinc cyanamide; zinc ferrite; or a combination thereof.

Thermochromic refers to ingredients such as pigments and dyes and the like, which undergo a change in color upon a change in temperature. At least one thermochromic pigment is placed within the packet. The thermochromic pigment changes color in response to changes in temperature. These materials change color at specific temperatures or temperature ranges. For example, leuco dyes can be used which include spirolactones such as fluorans or crystal violet lactone, spiropyrans, fulgides, and the like. Color change can also be obtained by use liquid crystals placed within the packet such as cholesteryl esters, cyano-biphenyls, and the like.

The thermochromic pigment may range from about 1 weight percent to about 10 weight percent of the admixture. More than one thermochromic pigment may be combined together to provide multiple color changes as the temperature changes. For example, a first pigment may undergo a color change from about 75-80 degrees Fahrenheit combined with a second thermochromic pigment having a color change from about 80-85 degrees Fahrenheit. The base pigment can be colorless or colored. For instance, a colorless pigment can be employed which turns to red as the temperature of the admixture increased. The temperature of the admixture increases in response to the temperature of the cellular telephone. The change in color can be a decorative response to the heavy use of the telephone, as well as a visual indicator that the telephone should not be placed against the head of the individual.

With properties such as cooling, fire retardant agent, and color-changing as temperature rises in the cellular telephone 30 which is inserted into the casing 10 whereby the packet 50 is in constant contact with the telephone 30 casing that houses the battery. The packet 50 including the hydrated super absorbent polymer is thin enough to be placed between the rear surface 16 of the case 10 and the underside 32 of the cellular phone 30, thereby being adjacent to the cellular phone battery. The packet 50 is sized to fit within the casing 10. The packet 50 is a sealed pouch 54 for holding at least 3 ounces of an admixture 52 of potassium-based super absorbent polymer and water. The admixture 52 has properties which enable the polymer to be confined to a particular area because of its relatively high viscosity. The properties of the admixture 52, in particular its viscosity, enable the admixture 52 to remain on vertical, horizontal, and curved surfaces formed by the gel pack pouch 54. Unlike pure water, the admixture 52 does not provide an electrically conductive path. The present invention adds a predetermined amount of polymer to a predetermined amount of water to obtain an admixture 52 which has properties that enable a cooling effect, dissipates heat, suppresses fire, and is color-changing dependent on temperature.

In use, the packet 50 holds the admixture which will be of a certain color and visible through the rear surface 16 and sidewalls 12 of the casing 10 if the sidewalls are also translucent. Should the temperature of the phone 30 rise, the color of the packet 50 will also change. It may move through a color spectrum as the temperature of the phone rises in order to make the user aware that the phone might be exposed to too much heat. Another advantage of the admixture is it is visible from the rear surface 16 and can be visible through translucent sidewalls 12 of the casing 10 so the identity of the phone 30 is more easily identifiable by the user. The user can choose a color of their liking for the packet 50 and from thereon the user will more easily identify their phone 30 because of the visible packet 50 in the casing 10. Furthermore, the packet 50 will be juxtapositioned to the phone battery so that in an emergency situation, such as a thermal meltdown, the admixture 52 will act as a fire retardant and inhibit damage to the user or property.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cellular phone case comprising:
   a casing for receipt of cellular phone, said receptacle having a translucent back wall to be positioned against a rear surface of a cellular phone;
   a packet containing about 3 ounces of an admixture of hydrated superabsorbent polymer positioned between said translucent wall and the rear surface of the cellular phone;
   a color additive having a thermochromic pigment capable of changing colors added to said admixture, said color additive visually discernible through said translucent wall and capable of changing colors when said admixture is subjected to a temperature change;
   wherein a cellular phone positioned within receptacle is juxtaposition with said packet which is viewable through said translucent wall.

2. The cellular phone case according to claim 1 including a second thermochromic pigment added to said admixture, wherein said first thermochromic pigment changes colors when subjected to a first temperature change and said second thermochromic pigment changes colors when subjected to a second temperature change.

3. The cellular phone case according to claim 1 wherein said color additive is a blue cobalt or red iron oxide.

4. The cellular phone case according to claim 1 wherein said color additive is present in a percent dry weight from about 1% to about 10% of total weight of the admixture.

5. The cellular phone case according to claim 1 wherein said color additive is a leuco dye.

6. The cellular phone case according to claim 1 wherein said color additive is a liquid crystal cholesteryl ester or liquid crystal cyano-biphenyls.

\* \* \* \* \*